US006868723B2

United States Patent
Shajii et al.

(10) Patent No.: US 6,868,723 B2
(45) Date of Patent: Mar. 22, 2005

(54) THERMAL ANEMOMETRY MASS FLOW MEASUREMENT APPARATUS AND METHOD

(75) Inventors: Ali Shajii, Canton, MA (US); Nicholas Eugene Kottenstette, South Bend, IN (US); R. Leonard Myatt, Norfolk, MA (US); Jeffrey Vincent Anastas, Kennebunk, ME (US)

(73) Assignee: MKS Instruments, Inc., Wilmington, MA (US)

( * ) Notice: Subject to any disclaimer, the term of this patent is extended or adjusted under 35 U.S.C. 154(b) by 34 days.

(21) Appl. No.: 10/440,371

(22) Filed: May 16, 2003

(65) Prior Publication Data

US 2004/0226358 A1 Nov. 18, 2004

(51) Int. Cl.[7] ................................................. G01F 1/66
(52) U.S. Cl. ................................... 73/204.22; 73/866.5
(58) Field of Search ......................... 73/202.5, 204.11, 73/204.22, 204.23, 861.42, 861.52, 866.5

(56) References Cited

U.S. PATENT DOCUMENTS 4,016,758 A * 4/1977 Taylor ..................... 73/204.24
5,515,295 A 5/1996 Wang
6,023,969 A * 2/2000 Feller ...................... 73/204.25
6,642,807 B1 * 11/2003 Gard ........................ 333/24 R

OTHER PUBLICATIONS

Mass Flow Meters and Controllers for Gases, Mass-Stream™, M+W Instruments, (12 pages).
TSI Mass Flowmeters, Theory of Operation, Copyright 2001, TSI Incorporated, (1 page).
Economical Thermal Mass Flow Sensor Based on Constant Temperature Anemometry, Lotters, Joost, Bronkhorst High-Tech B. V, presented at Sensor 99, May 18–20, 1999, Nurnberg, Germany, (6 pages).

* cited by examiner

Primary Examiner—Edward Lefkowitz
Assistant Examiner—Corey D. Mack
(74) Attorney, Agent, or Firm—McDermott Will & Emery LLP

(57) ABSTRACT

A mass flow measurement apparatus including a flow path defined by a tubular side wall, a probe extending through the side wall into the flow path so that a first portion of the probe is located in the flow path and a second portion of the probe, extends out of the side wall, a heater element secured to the probe, and a seal preventing fluid flowing through the flow path from contacting the heater element.

25 Claims, 10 Drawing Sheets

THERMAL ANEMOMETRY MASS FLOW MEASUREMENT APPARATUS AND METHOD

FIELD OF THE INVENTION

The present invention relates to an apparatus and a method for measuring fluid flow and, more particularly, to an apparatus and a method for measuring gas flow using a hot wire anemometer.

BACKGROUND OF THE INVENTION

In the semiconductor manufacturing industry, it is necessary to achieve precise control of the quantity, temperature and pressure of one or more reactant materials which are delivered in a gaseous state to a reaction chamber. Some process reactants, such as nitrogen gas, are relatively easy to deliver in a controlled manner at the temperatures and pressures required for the reaction to occur. Other reactants, however, may be highly corrosive, toxic, pyrophoric, or unstable at the temperatures and/or pressures at which delivery to the reaction chamber is required. Such characteristics of the reactants make their accurate and controlled delivery to a reaction chamber extremely difficult to achieve.

Mass flow controllers (hereinafter, "MFCs") are widely used in the industry to control the delivery of process reactants. Two broad categories of MFCs, thermal and pressure-based, have been developed to handle the diverse delivery requirements of a wide variety of process reactants. A mass flow controller generally includes a mass flow measurement apparatus for measuring the rate of flow of gas through the controller, a valve for controlling the flow of gas through the controller and a computer connected to the mass flow measurement apparatus and the valve. The computer is programmed with a desired flow rate, which the computer compares to an actual flow rate as measured by the mass flow measurement apparatus. If the actual flow rate does not equal the desired flow rate, the computer is further programmed to open or close the valve until the actual flow rate equals the desired flow rate.

Thermal mass flow controllers operate on the principle that the rate of heat transfer from the walls of a flow channel to a fluid flowing in laminar flow within the channel is a function of the difference in temperatures of the fluid and the channel walls, the specific heat of the fluid, and the mass flow rate of the fluid. Thus, the rate of mass flow of a fluid (in the laminar flow regime) can be determined if the properties of the fluid and the temperatures of the fluid and tube are known.

On the other hand, pressure-based MFCs establish a viscous flow condition by creating two pressure reservoirs along the flow path of a fluid, for example, by introducing a restriction in the diameter of the flow path. The restriction may comprise an orifice or nozzle. In the reservoir upstream of the flow restrictive aperture, the fluid has a pressure $P_1$ and a density $\rho_1$, which can be used to determine the flow with a known aperture under viscous chock flow conditions.

It is also known to measure gas flow rates with a hot wire anemometer. In a hot wire anemometer, the gas typically is passed over a single heated wire, reducing the temperature of the wire. The change in resistance of the heated wire is determined and correlated with the flow rate of the gas. A more advanced technique employs a second heated wire positioned downstream of the first heated wire. The gas is passed through the system, reducing the temperature of the upstream wire and increasing the temperature of the downstream wire. The temperature difference is then recorded as an output signal.

What is still desired, however, is a mass flow controller including a new and improve apparatus and method for measuring rates of mass flow. Preferably, the new and improved apparatus and method will utilize a hot wire anemometer to measure rates of mass flow. In addition, the new and improved apparatus and method will preferably be material compatible with the gas being measured, not be adversely effected by vortex shedding, be insensitive to gas type, and insensitive to ambient temperature changes. Moreover, the new and improved apparatus and method will preferably respond quickly to changes in flow rates and will be able to measure a wide range of flow rates.

SUMMARY OF THE INVENTION

The present invention provides a new and improved mass flow measurement apparatus including a flow path defined by a tubular side wall, a probe extending through the side wall into the flow path so that a first portion of the probe is located in the flow path and a second portion of the probe extends out of the side wall, a heater element secured to the probe, and a seal preventing fluid flowing through the flow path from contacting the heater element.

According to one aspect of the present invention, the seal is provided between the side wall and the probe and the heater element is secured to the second portion of the probe. According to another aspect, the probe is made of one of stainless steel and aluminum.

According to an additional aspect of the present invention, the heater element comprises a first and a second heater element secured to the second portion of the probe, and the second heater element is positioned further from the side wall than the first heater element.

According to a further aspect of the present invention, the probe comprises first and second probes extending through the side wall into the flow path, and the heater element comprises a first and a second heater element secured, respectively, to the first and the second probes. According to one aspect, one of the first and the second probes extends further into the flow path than the other of the first and the second probes.

According to another aspect of the present invention, the flow path comprises first and second parallel flow paths sharing a single inlet and wherein the second flow path is closed by an end wall, the probe comprises a first probe extending into the first flow path and a second probe extending into the second flow path, the heater element comprises a first heater element positioned on the first probe and a second heater element positioned on the second probe, and the seal comprises a first seal preventing fluid flowing through the first flow path from contacting the first heater element and a second seal preventing fluid flowing through the second flow path from contacting the second heater element.

According to an additional aspect of the present invention, the flow path includes a narrow portion and the probe extends into the narrow portion of the flow path.

Among other aspects and advantages, the mass flow measurement apparatus of the present invention is materially compatible with the gas being measured, is not adversely effected by vortex shedding, is insensitive to gas type, and is insensitive to ambient temperature changes. Moreover, the new and improved mass flow measurement apparatus of the present invention responds quickly to changes in flow rates and is able to measure a wide range of flow rates.

Additional aspects and advantages of the present invention will become readily apparent to those skilled in this art from the following detailed description, wherein exemplary embodiments of the present invention are shown and described, simply by way of illustration of the best modes contemplated for carrying out the present invention. As will be realized, the present invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF EXEMPLARY EMBODIMENTS

Figure 1:
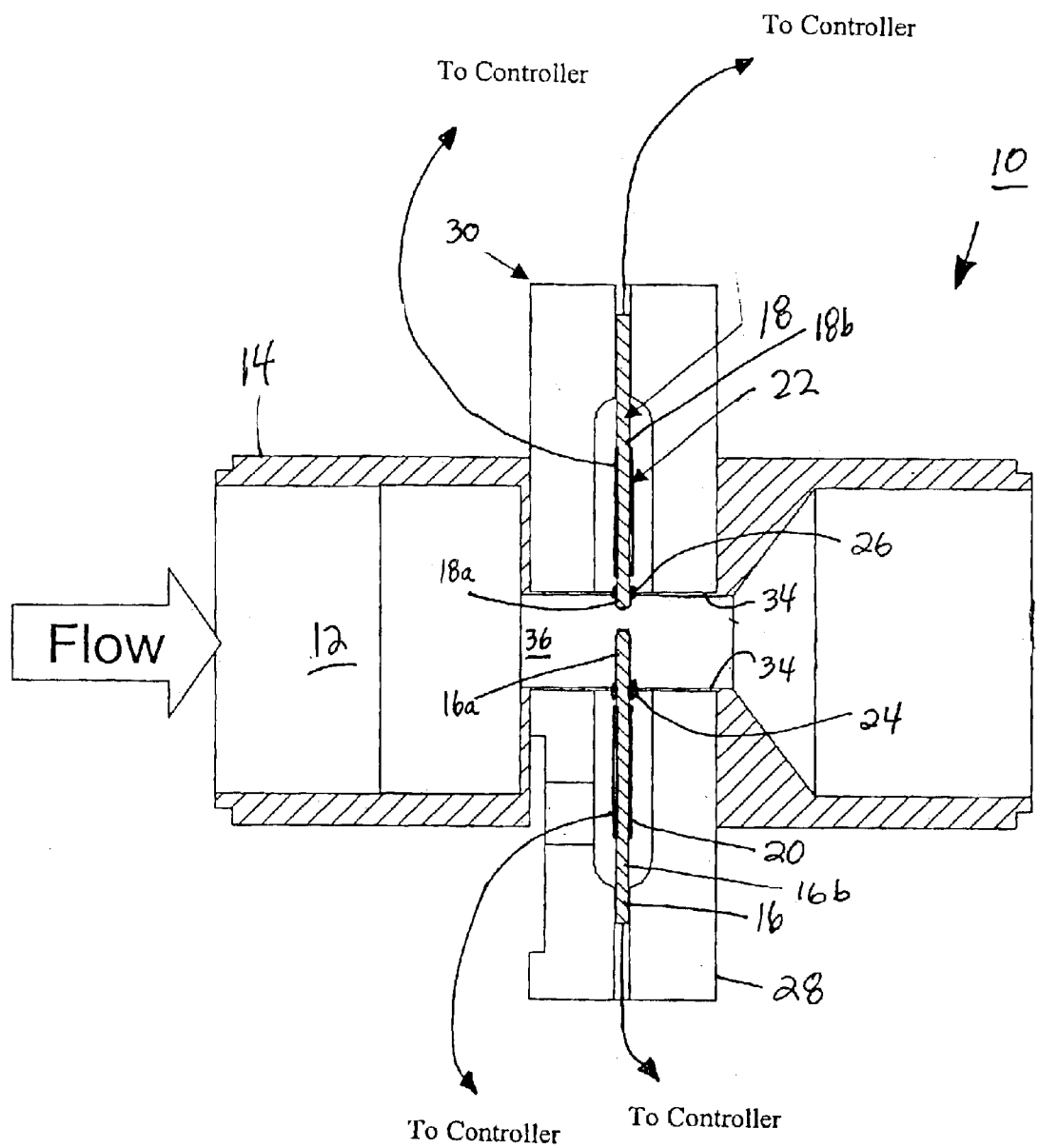
FIG. 1 is a sectional side view of an exemplary embodiment of a mass flow measurement apparatus constructed in accordance with the present invention.

Referring to FIG. 1, an exemplary embodiment of a mass flow measurement apparatus 10 constructed in accordance with the present invention utilizes hot wire anemometer physics to measure rates of mass flow. The mass flow measurement apparatus 10 can be used, for example, as part of a mass flow controller to control the delivery of process reactants in the semiconductor manufacturing industry. The mass flow measurement apparatus 10 generally includes a flow path 12 defined by a tubular side wall 14, and first and second probes 16, 18 extending through the side wall 14 into the flow path 12 so that first portions 16a, 18a of the probes 16, 18 are located in the flow path 12 and second portions 16b, 18b of the probes 16, 18 extend out of the side wall 14. The apparatus 10 also includes first and second heater elements 20, 22 secured, respectively, to the first and the second probes 16, 18, and seals 24, 26 preventing fluid flowing through the flow path 12 from contacting the heater elements 20, 22.

The probes 16, 18 are preferable made of a material that is compatible with the type of gas flowing through the flow path 12, and the seals 24, 26 ensure that the heater elements 20, 22 are not in contact with the gas and, thus, are not required to be material-compatible with the gas. If the apparatus 10 is to be used in the semiconductor manufacturing industry, then preferably the probes 16, 18 are made from either aluminum or stainless steel.

In the exemplary embodiment of FIG. 1, the seals 24, 26 are provided between the side wall 14 and the probes 16, 18, and the heater elements 20, 22 are secured to the second portions 16b, 18b of the probes 16, 18. The seals comprise, for example, welds 24, 26 between the probes 16, 18 and the side wall 14. Alternatively, the heater elements 20, 22 can be secured to the first portions 16a, 18a of the probes 16, 18 and covered in a fluid-tight manner with material-compatible sleeves.

The probes 16, 18 and the heater elements 20, 22 are all connected to a controller (not shown), such as a computer processor, which monitors the temperatures of the probes 16, 18, provides energy to the heater elements 20, 22 so that the probes 16, 18 remains at a constant temperature, measures the amount of energy provided to the heater elements 20, 22, and calculates the mass flow through the flow path 12 based at least in part on the energy provided to the heater elements 20, 22. Such methods of calculating mass flow based at least in part on the energy provided to the heater elements 20, 22 are governed by anemometer physics, which are know to those skilled in the art of hot wire anemometers, and thus is not described here.

In the exemplary embodiment of FIG. 1, the first probe 16 extends further into the flow path 12 than the second probe 18, such that the second probe 18 can be used to cancel ambient (outside) temperature changes, so that the apparatus 10 is insensitive to ambient temperature changes. For example, if the controller measures that the energies being supplied to the first and the second heater elements 20, 22 are not proportional to the amount that the probes 16, 18 extend into the flow path 12, then the controller is programmed to regard the temperature change of one of the probes 16, 18 as being cause by a change in the ambient temperature—not a change in flow.

In the exemplary embodiment of FIG. 1, the first and the second probes 16, 18 are positioned at about the same longitudinal position in the flow path 12. In addition, the first probe 16 is positioned laterally opposite the second probe 18 within the flow path 12. This arrangement advantageously prevents one of the probes 16, 18 from being adversely effected by vortex shedding coming off the other of the probes 16, 18, for example, if the probes 16, 18 were placed in series.

Figure 2:
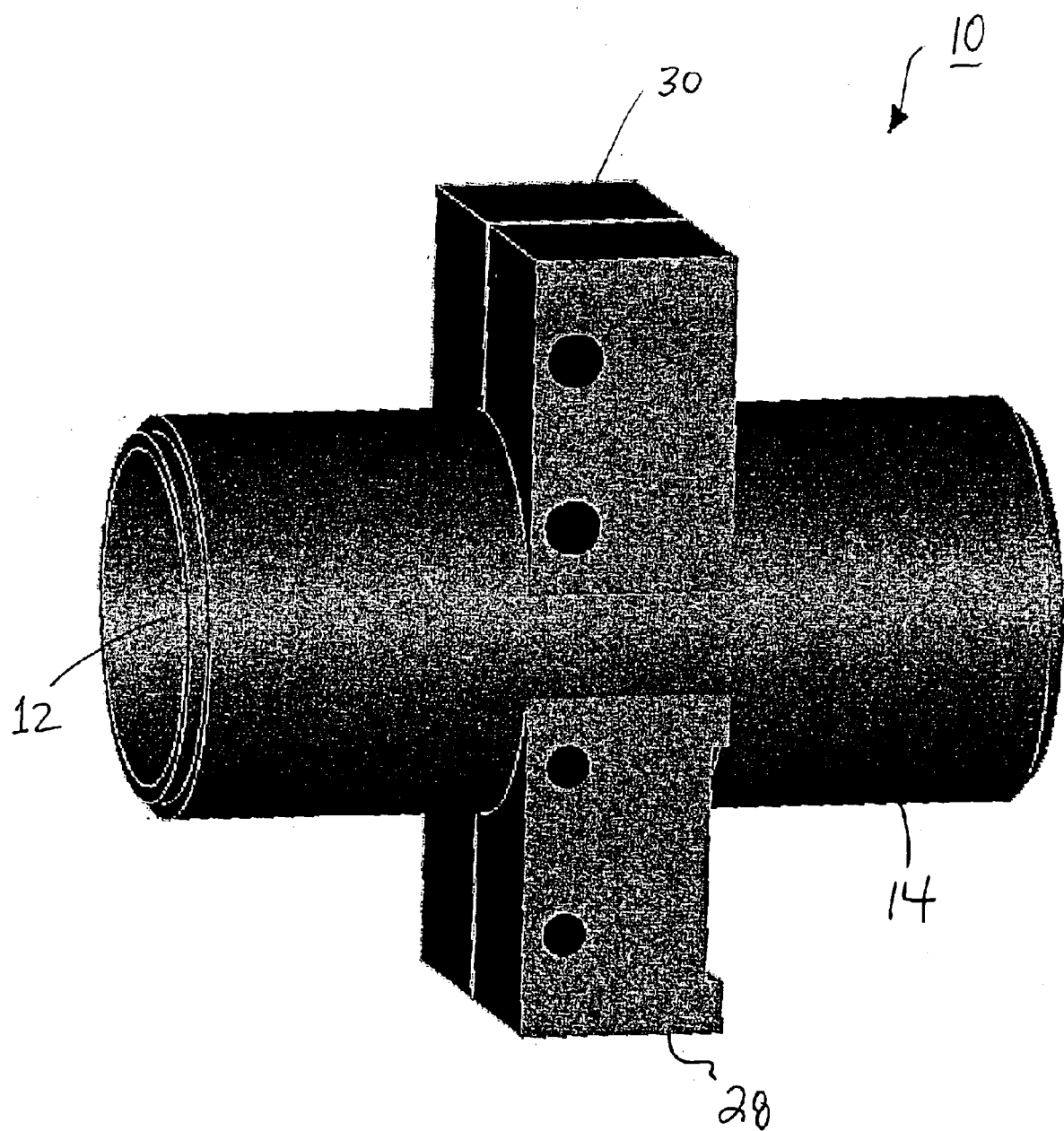
FIG. 2 is a perspective view of the mass flow measurement apparatus of FIG. 1.
Figure 3:
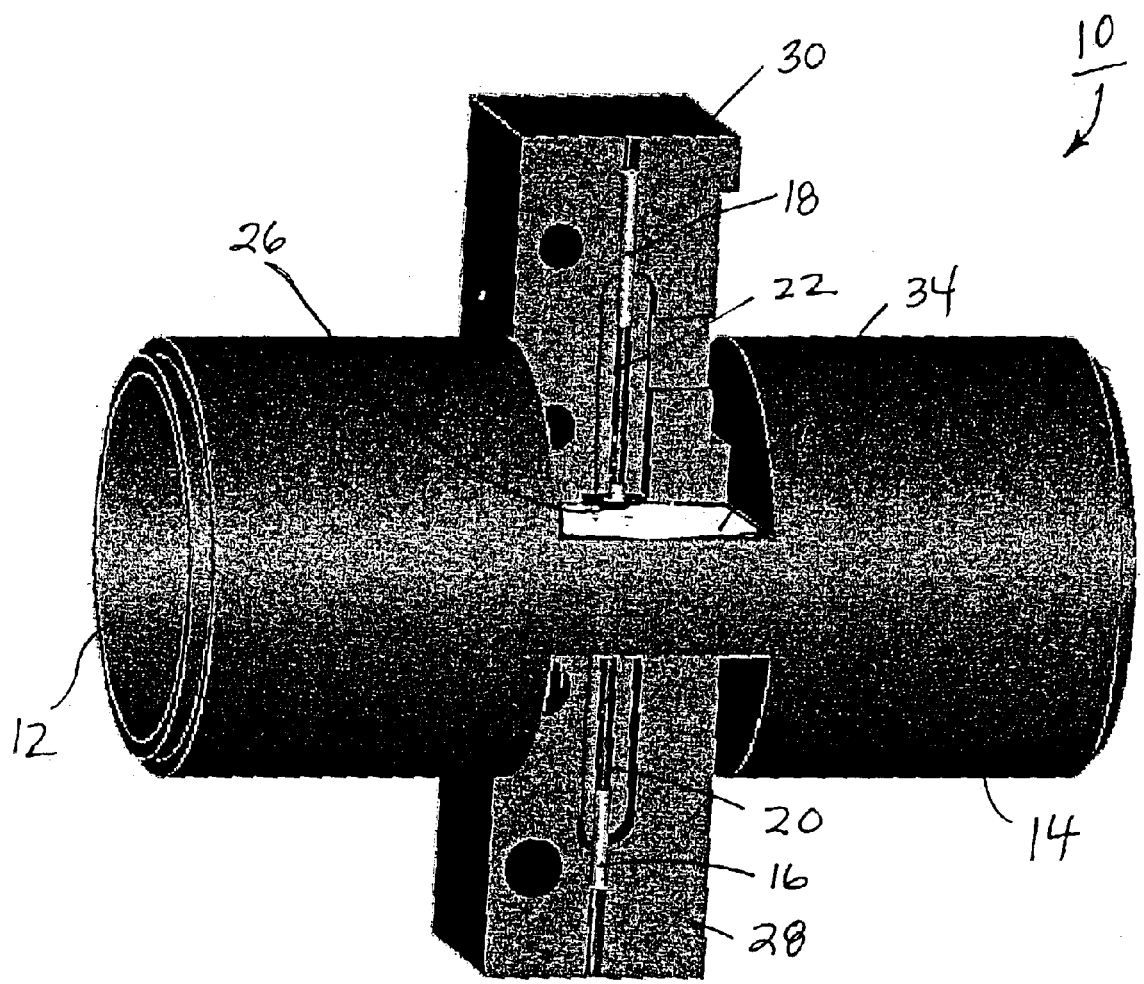
FIG. 3 is a perspective view of the mass flow measurement apparatus of FIG. 1, showing portions of probe housings removed.
Figure 4:
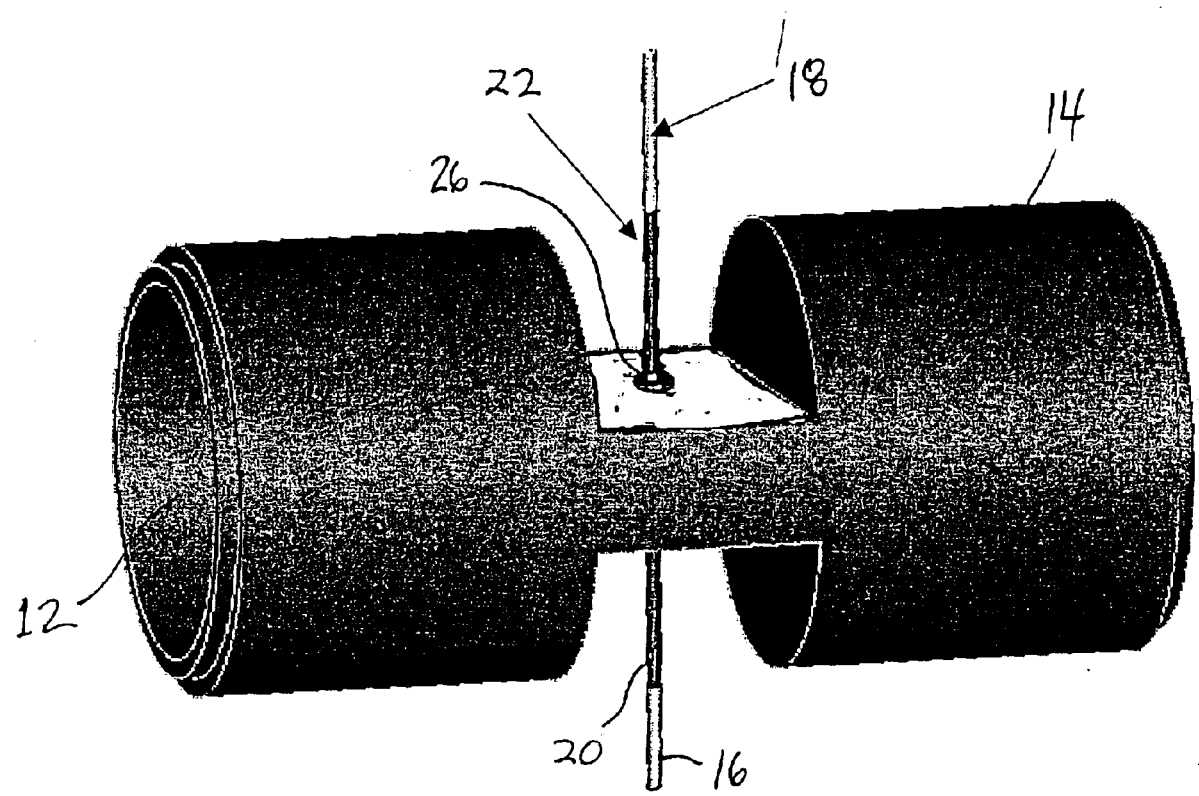
FIG. 4 is a perspective view of the mass flow measurement apparatus of FIG. 1, showing all of the probe housings removed.
Figure 5:
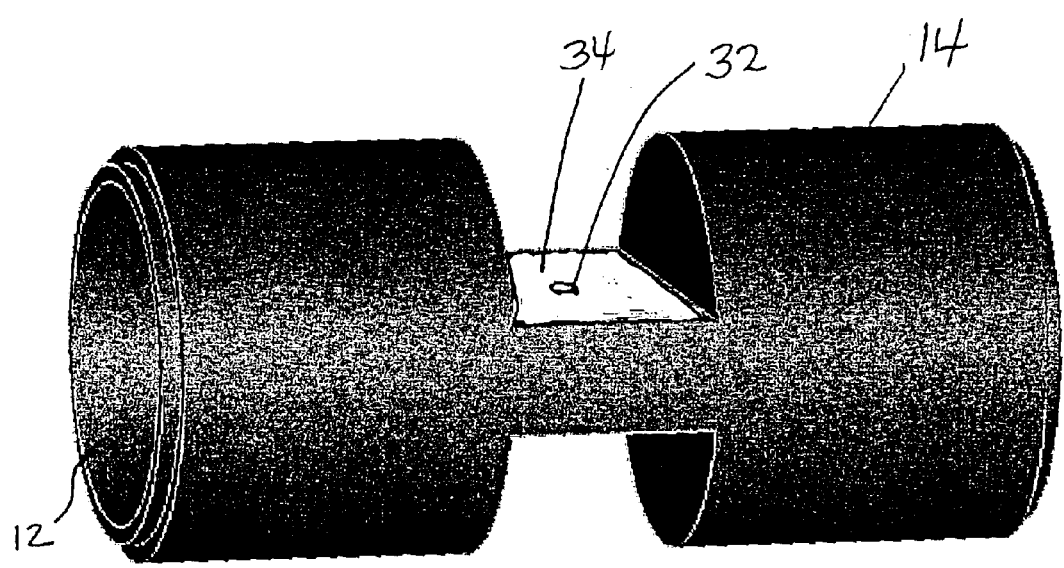
FIG. 5 is a perspective view of the mass flow measurement apparatus of FIG. 1, showing the probe housings and probes removed.

FIG. 2 is a perspective view of the mass flow measurement apparatus 10 of FIG. 1. The apparatus 10 includes housings 28, 30 for the probes 16, 18 and the heater elements 20, 22, that are secured to exterior surfaces of the side Wall 14. In FIG. 3 portions of the probe housings 28, 30 are shown removed, while in FIG. 4 all of the probe housings are shown removed. In FIG. 5 the probes are also shown removed to reveal an openings 32 in mounting diaphragms 34 of the side wall 14.

As shown best in FIG. 1, the flow path 12 includes a narrow portion 36, defined by the diaphragms 34, and the probes 16, 18 extend into the narrow portion 36 of the flow path 12. The narrow portion 36 causes the velocity of gas to be increased over the probes 16, 18 to thereby increase the sensitivity to flow of the probes 16, 18.

Figure 6:
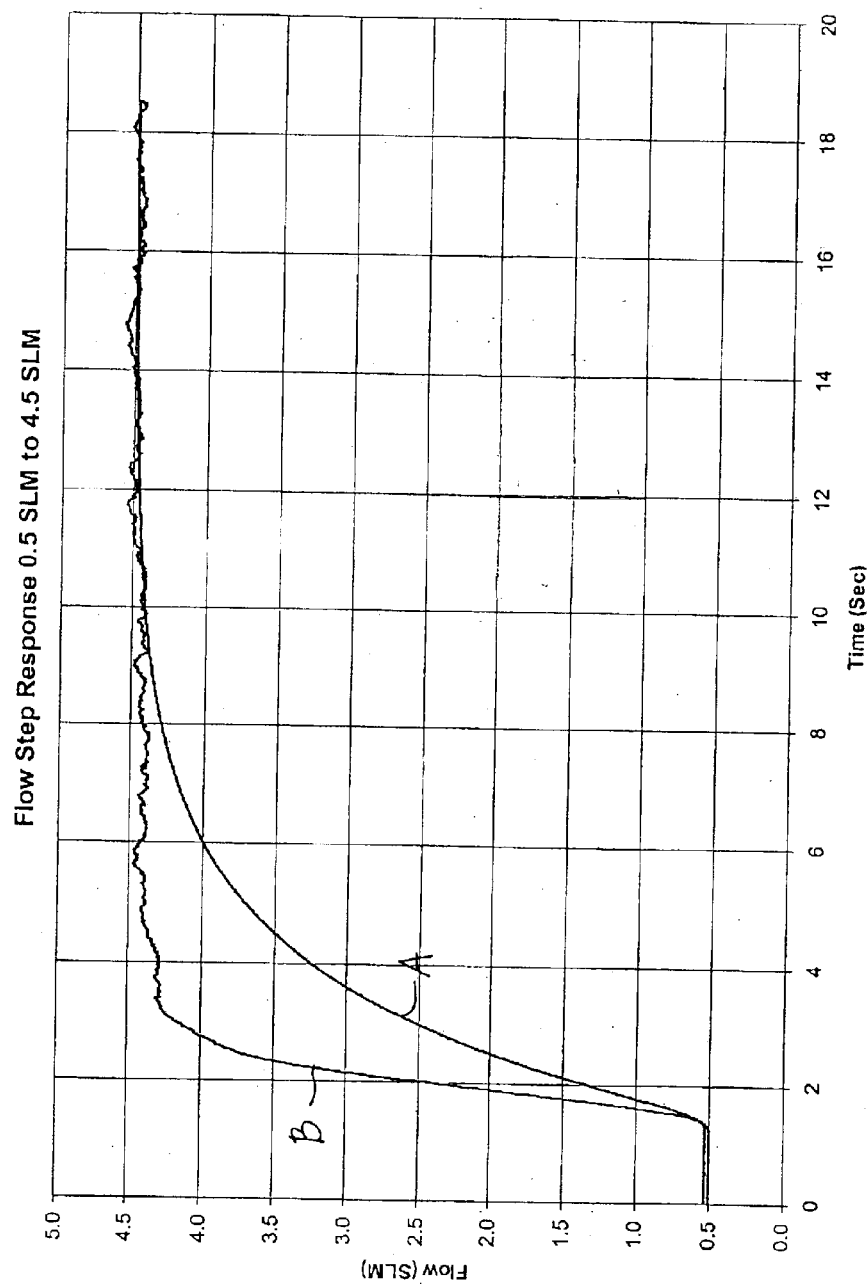
FIG. 6 is a graph of flow versus time for the mass flow measurement apparatus of FIG. 1 and a mass flow measurement apparatus of the prior art, illustrating that the mass flow measurement apparatus of the present invention responds quickly to changes in flow rates.
Figure 7:
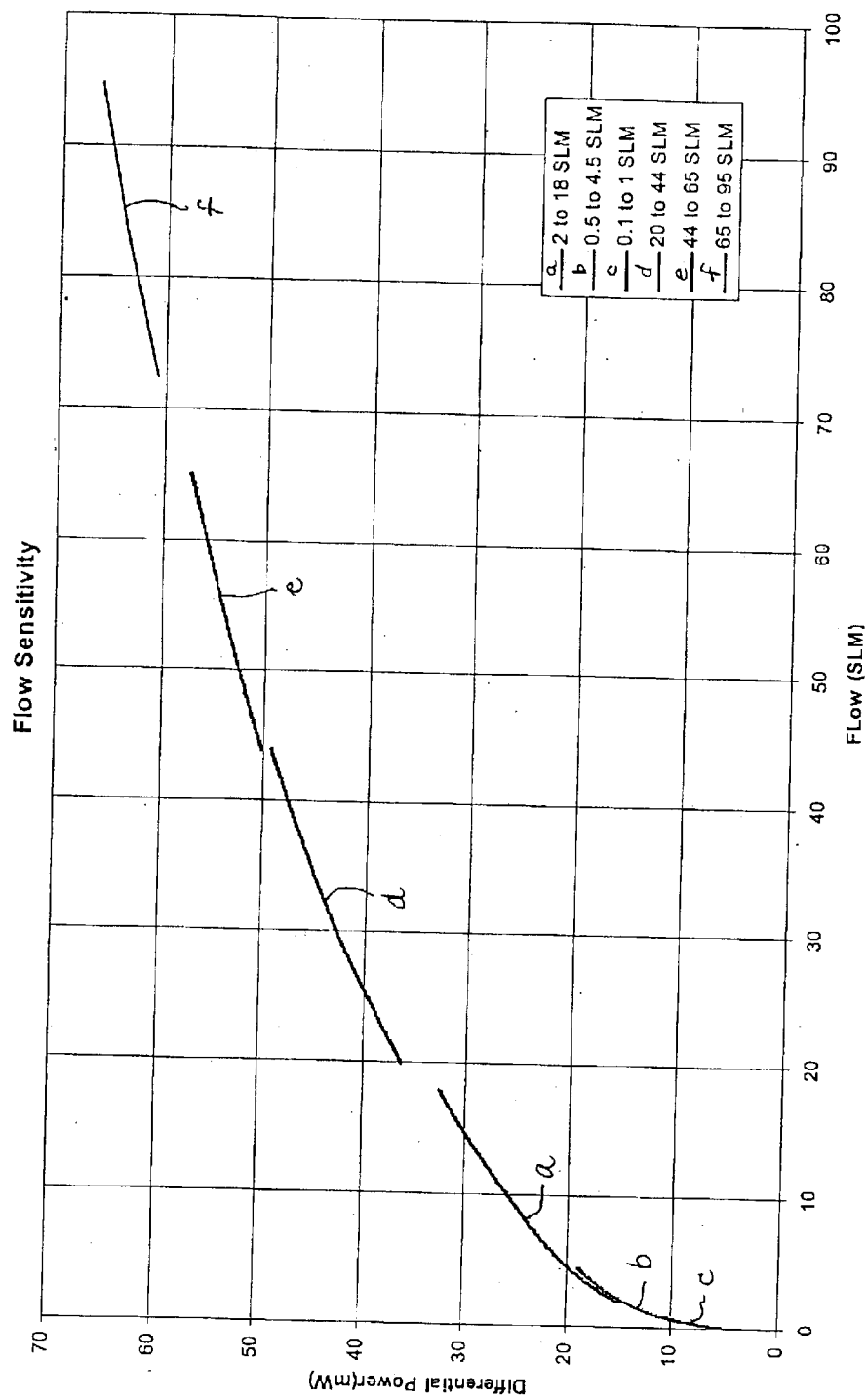
FIG. 7 is a graph of differential power versus flow for the mass flow measurement apparatus of FIG. 1 for flows a–f, illustrating that the mass flow measurement apparatus of the present invention is able to measure a wide range of flow rates.

FIG. 6 is a graph of flow versus time for the mass flow measurement apparatus 10 of FIG. 1, line "B", and a mass flow measurement apparatus of the prior art, line "A", illustrating that the mass flow measurement apparatus 10 of the present invention responds more quickly to changes in flow rates than the mass flow measurement apparatus of the prior art. FIG. 7 is a graph of differential power versus flow for the mass flow measurement apparatus 10 of FIG. 1 for different flows a–f, illustrating that the mass flow measurement apparatus 10 of the present invention is able to measure a wide range of flow rates.

As an example of an application for the mass flow measurement apparatus 10 of FIGS. 1 through 5, the mass flow measurement apparatus 10 can be incorporated into a mass flow controller (MFC). As is known, a MFC is for controlling the flow rate of a gas from a source and can be used, for example, in the semiconductor manufacturing industry to precisely deliver a process vapor to a process chamber for making a semiconductor wafer. The MFC generally includes a valve for controlling flow through the flow path of the mass flow measurement apparatus 10, and a control device programmed to receive a predetermined desired flow rate from a user, receive an indication of actual flow from the mass flow measurement apparatus 10, and operate the valve in order to increase or decrease the actual flow if the actual flow rate doe not equal the desired flow rate.

Figure 8:
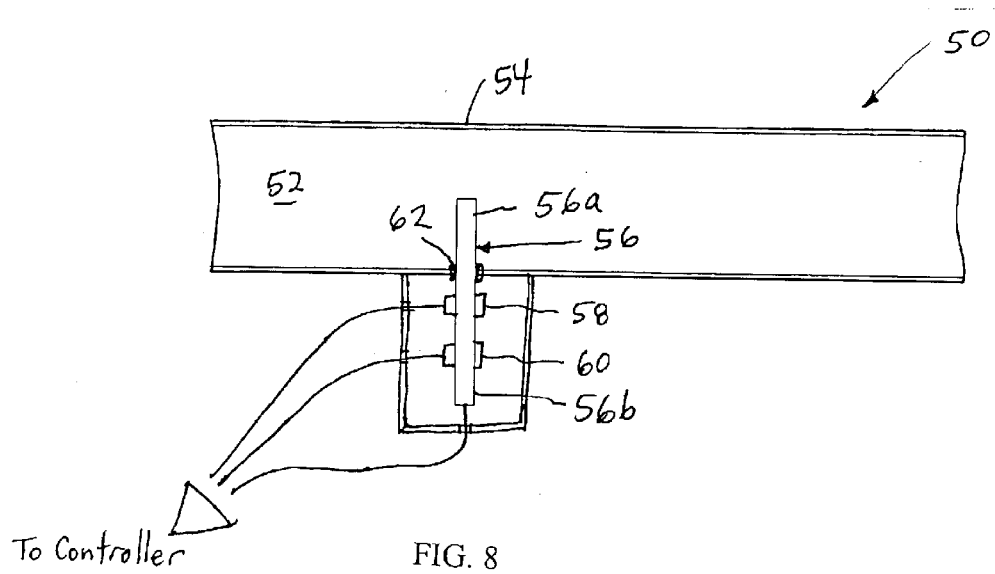
FIG. 8 is a sectional side view of another exemplary embodiment of a mass flow measurement apparatus constructed in accordance with the present invention.

FIG. 8 shows another exemplary embodiment of a mass flow measurement apparatus 50 constructed in accordance with the present invention. The mass flow measurement apparatus 50 includes a flow path 52 defined by a tubular side wall 54, and a probe 56 extending through the side wall 54 into the flow path 52 so that a first portion 56a of the probe 56 is located in the flow path 52 and a second portion 56b of the probe 56 extends out of the side wall 54. The apparatus 50 also includes first and second heater elements 58, 60 secured to the second portion 56b of the probe 56, and the second heater element 60 is positioned further from the side wall 54 than the first heater element 58. The two heater elements 58, 60 allow the apparatus to be insensitive to changes in ambient temperature. A seal 62 prevents fluid flowing through the flow path 52 from contacting the heater elements 58, 50.

Figure 9:
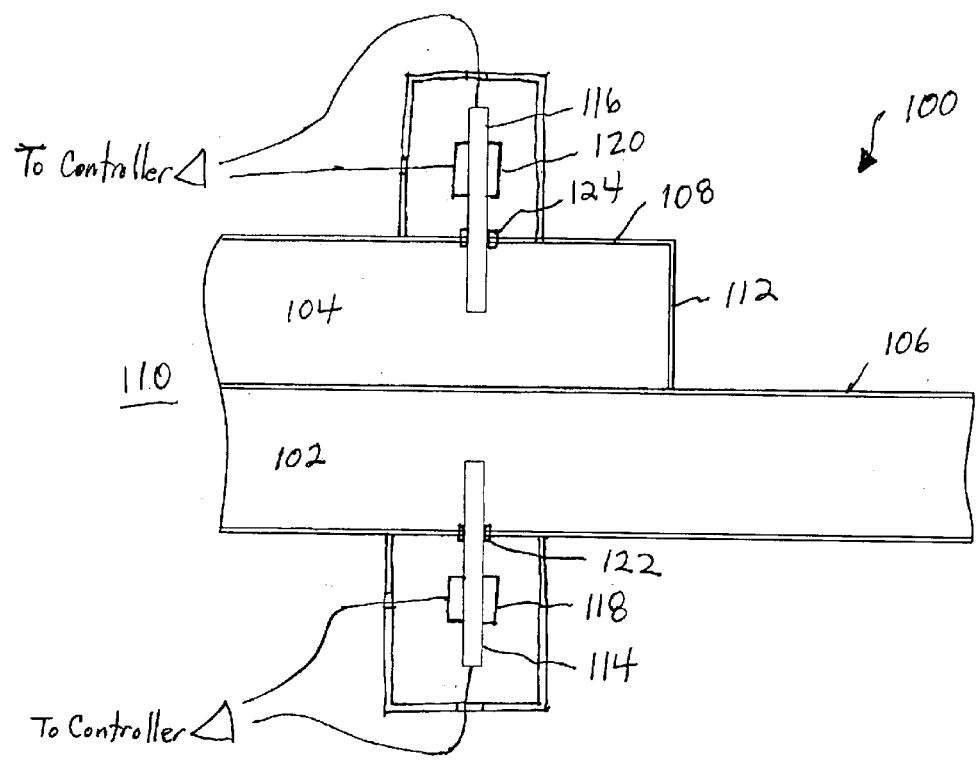
FIG. 9 is a sectional side view of an additional exemplary embodiment of a mass flow measurement apparatus constructed in accordance with the present invention.

An additional exemplary embodiment of a mass flow measurement apparatus 100 constructed in accordance with the present invention is shown in FIG. 9. The apparatus 100 includes first and second parallel flow paths 102, 104 defined by tubular side walls 106, 108 sharing a single inlet 110. The second flow path is closed by an end wall 112. A first probe 114 extends into the first flow path 102, a second probe 116 extends into the second flow path 104, a first heater element 118 is positioned on the first probe 114, and a second heater element 120 is positioned on the second probe 116. The apparatus 100 also includes a first seal 122 preventing fluid flowing through the first flow path 102 from contacting the first heater element 118, and a second seal 124 preventing fluid flowing through the second flow path 104 from contacting the second heater element 120.

Because the second flow path 104 is closed by the end wall 112, the flow through the second flow path 104 is always zero. Thus the temperature of second probe 116 will only change if the ambient temperature changes or if the type of gas passing through the apparatus 100 is changed. Thus, the embodiment 100 of FIG. 9 has been found to be insensitive to ambient temperature changes and to the type of gas passing through the apparatus 100.

Figure 15:
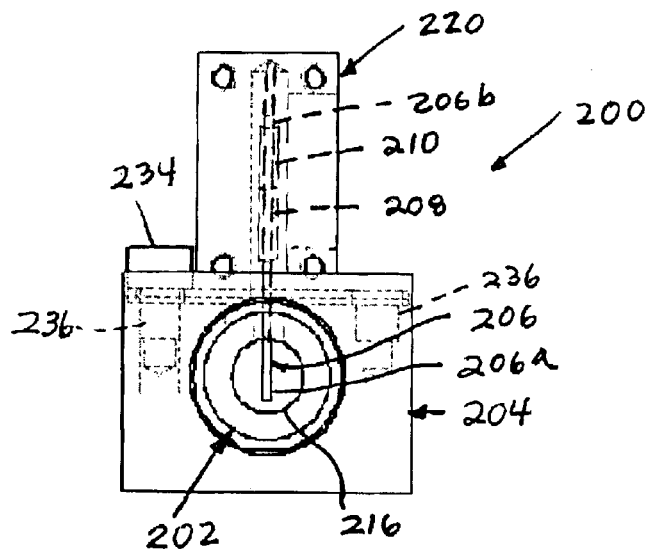
FIG. 15 is an opposite end elevation view of the housing and the probe of FIG. 13, shown mounted to a tubular side wall defining a flow path such that the probe extends into the flow path.

FIG. 15 shows another exemplary embodiment of a mass flow measurement apparatus 200 constructed in accordance with the present invention. The mass flow measurement apparatus 200 includes a flow path 202 defined by a tubular side wall 204, and a probe 206 extending through the side wall 204 into the flow path 202 so that a first portion 206a of the probe 206 is located in the flow path 202 and a second portion 206b of the probe 206 extends out of the side wall 204. The apparatus 200 also includes first and second heater elements 208, 210 secured to the second portion 206b of the probe 206, and the second heater element 210 is positioned further from the side wall 204 than the first heater element 208. The two heater elements 208, 210 allow the apparatus to be insensitive to changes in ambient temperature. A seal (not viewable) prevents fluid flowing through the flow path 202 from contacting the heater elements 208, 200. The flow path 202 includes a narrow portion 216, and the probe 206 extends into the narrow portion 216 of the flow path 202. The narrow portion 216 causes the velocity of gas to be increased over the probe 206 to thereby increase the sensitivity to flow of the probe 206.

Figure 10:
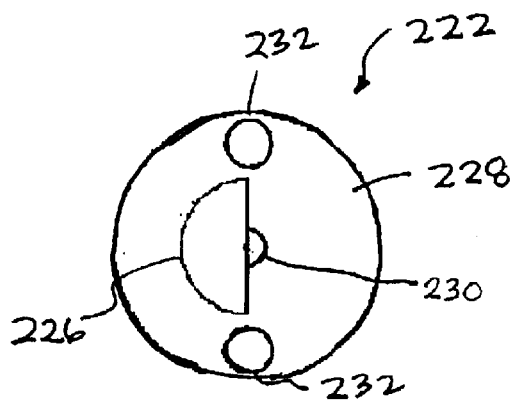
FIG. 10 is a top plan view of a first portion of another exemplary embodiment of a probe housing constructed in accordance with the present invention.
Figure 13:
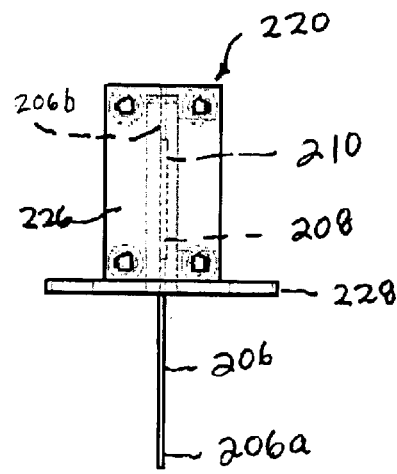
FIG. 13 is an opposite end elevation view of the first portion of the housing of FIG. 10, shown with a second portion of the housing attached to the first portion and a probe extending from the housing.
Figure 11:
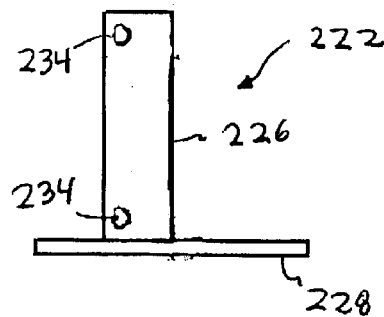
FIG. 11 is a side elevation view of the first portion of the housing of FIG. 10.
Figure 12:
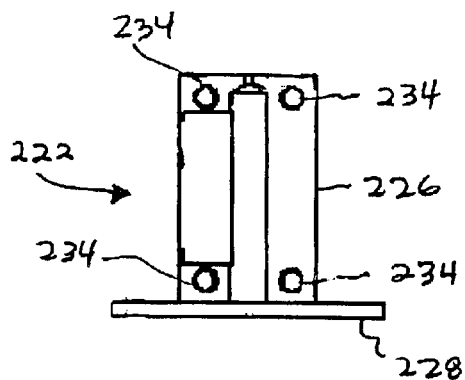
FIG. 12 is an end elevation view of the first portion of the probe housing of FIG. 10.
Figure 14:
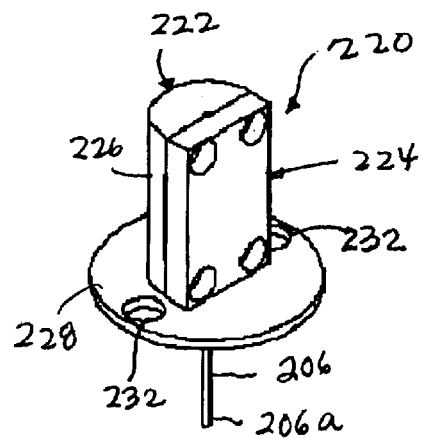
FIG. 14 is a perspective view of the housing and the probe of FIG. 13.

The apparatus 200 of FIG. 15 also includes a housing 220 for the probe 206 and the heater elements 208, 210, that is secured to exterior surfaces of the side wall 204. FIGS. 13–14 show the housing 220 and the probe 206. The housing 220 includes a first portion 222 and a second portion 224 secured together with suitable fasteners, such as bolts (not shown). The first portion 222, which is also shown in FIGS. 10–12, includes a body 226 extending from a fastener plate 228 defining an aperture 230 for the probe 206. The fastener plate 228 includes openings 232 for receiving suitable fasteners, such as bolts 234, for securing the first portion 222 of the housing 220 to the side wall 204 of the flow path 202, as shown in FIG. 15 (the side wall 204 includes threaded bores 236 for receiving the bolts). The body 226 also includes opening 234 for receiving the fasteners for securing the second portion 224 to the first portion 222 of the housing 220, as shown in FIGS. 13–15.

Figure 16:
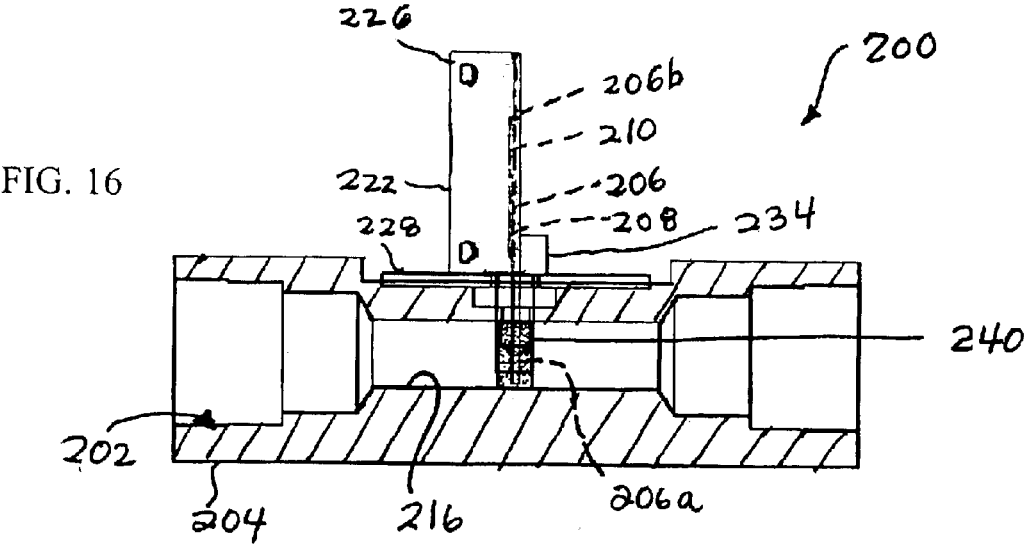
FIG. 16 is a side elevation view, partially in section, of the first portion of the housing and the probe of FIG. 13, shown mounted to the tubular side wall defining the flow path such that the probe extends into the flow path, and wherein a porous plug is fitted in the flow path surrounding the probe.
Figure 17:
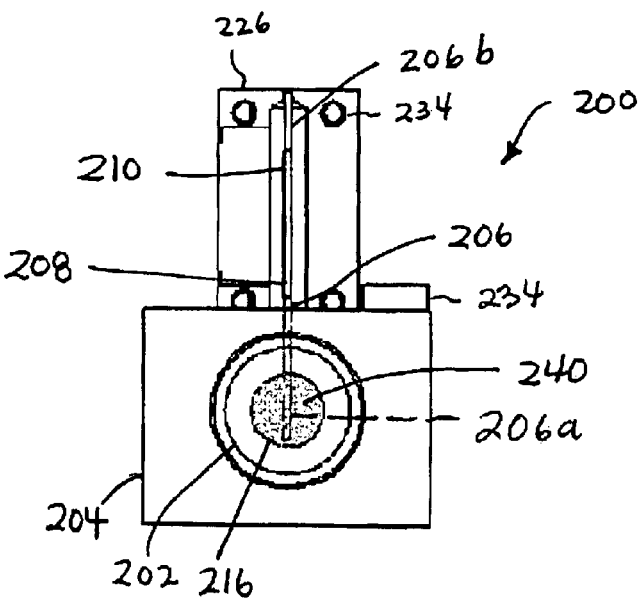
FIG. 17 is an end elevation view of the housing, the probe, the side wall and the plug of FIG. 16.

FIGS. 16–17 show the apparatus 200 of FIG. 15, but further including a plug 240 of porous material fitted in the flow path 202 surrounding the probe 206. The plug 240, which helps to break up flow around the probe 206, is made of a material that is compatible with the gas passing through the flow path and includes pores or passageways therethrough which are large enough to allow passage of the gas. In one exemplary embodiment, the plug 240 is made of aluminum or stainless steel.

Thus, new and improved mass flow measurement apparatuses and methods constructed in accordance with the present invention have been described. In particular, the present invention produces a new and improved, yet simple and effective arrangement for providing a mass flow measurement apparatus and method. The exemplary embodiments described in this specification have been presented by way of illustration rather than limitation, and various modifications, combinations and substitutions may be effected by those skilled in the art without departure either in spirit or scope from this invention in its broader aspects and as set forth in the appended claims. The mass flow measurement apparatuses and methods of the present invention as disclosed herein, and all elements thereof, are contained within the scope of at least one of the following claims. No elements of the presently disclosed measurement apparatuses and methods are meant to be disclaimed.

What is claimed is:

1. A mass flow measurement apparatus comprising:
   a flow path defined by a tubular side wall;
   a solid metal probe extending through the side wall into the flow path so that a first portion of the probe is located in the flow path and a second portion of the probe extends out of the side wall;
   a heater element secured to the second portion of the probe; and
   a seal provided between the side wall and the probe and preventing fluid flowing through the flow path from contacting the heater element.

2. A mass flow measurement apparatus according to claim 1, wherein the flow path includes a narrow portion and the probe extends into the narrow portion of the flow path.

3. A mass flow controller including a mass flow measurement apparatus according to claim 1, and further including:
   a valve for controlling mass flow through the mass flow measurement apparatus; and
   a processor connected to the mass flow measurement apparatus and the valve and programmed to receive a desired flow rate, compare the desired flow rate to an actual flow rate as measured by the mass flow measurement apparatus, and, if the actual flow rate does not equal the desired flow rate, operate the valve until the actual flow rate equals the desired flow rate.

4. A mass flow measurement apparatus comprising:
   a flow path defined by a tubular side wall;
   a probe extending through the side wall into the flow path so that a first portion of the probe is located in the flow path and a second portion of the probe extends out of the side wall;
   a heater element secured to the probe, wherein the heater element comprises a first and a second heater element secured to the second portion of the probe, and the second heater element is positioned further from the side wall than the first heater element and
   a seal preventing fluid flowing through the flow path from contacting the heater elements.

5. A mass flow measurement apparatus according to claim 4, wherein the seal is provided between the side wall and the probe.

6. A mass flow measurement apparatus according to claim 4, wherein the probe is made of one of stainless steel and aluminum.

7. A mass flow measurement apparatus according to claim 4, wherein the probe comprises first and second probes extending through the side wall into the flow path, and the heater element comprises a first and a second heater element secured, respectively, to the first and the second probes.

8. A mass flow measurement apparatus according to claim 7, wherein the first and the second probes are positioned at about the same longitudinal position in the flow path.

9. A mass flow measurement apparatus according to claim 8, wherein the first probe is positioned laterally opposite the second probes within the flow path.

10. A mass flow measurement apparatus comprising:
    a flow oath defined by a tubular side wall;
    a probe extending through the side wall into the flow path so that a first portion of the probe is located in the flow path and a second portion of the probe extends out of the side wall;
    a heater element secured to the probe; and
    a seal preventing fluid flowing through the flow path from contacting the heater elements;
    wherein the probe comprises first and second probes extending through the side wall into the flow path, and the heater element comprises a first and a second heater element secured, respectively, to the first and the second probes, wherein one of the first and the second probes extends further into the flow path than the other of the first and the second probes.

11. A mass flow measurement apparatus comprising:
    a flow path defined by a tubular side wall;
    a probe extending through the side wall into the flow path so that a first portion of the probe is located in the flow path and a second portion of the probe extends out of the side wall;
    a heater element secured to the probe; and
    a seal preventing fluid flowing through the flow path from contacting the heater element;
    wherein the flow path comprises first and second parallel flow paths sharing a single inlet and wherein the second flow path is closed by an end wall;
    the probe comprises a first probe extending into the first flow path and a second probe extending into the second flow path;
    the heater element comprises a first heater element positioned on the first probe and a second heater element positioned on the second probe; and
    the seal comprises a first seal preventing fluid flowing through the first flow path from contacting the first heater element and a second seal preventing fluid flowing through the second flow path from contacting the second heater element.

12. A mass flow measurement apparatus according to claim 11, wherein the seals are provided between the side walls and the probes and the heater elements are secured to the second portions of the probes.

13. A method for measuring mass flow comprising:
    defining a flow path with a tubular side wall;
    extending a solid metal probe through the side wall and into the flow path so that a first portion of the probe is located in the flow path and a second portion of the probe extends out of the side wall;

monitoring a temperature of the probe;

securing a heater element to the second portion of the probe;

providing energy to the heater element so that the probe remains at a constant temperature;

measuring the amount of energy provided to the heater element;

calculating the mass flow through the flow path based at least in part on the energy provided to the heater element; and providing a seal between the side wall and the probe for preventing fluid flowing through the flow path from contacting the heater element.

14. A method according to claim 13, wherein the probe comprises first and second probes extending through the side wall into the flow path, and the heater element comprises a first and a second heater element secured, respectively, to the first and the second probes.

15. A method according to claim 14, wherein the first and the second probes are positioned at about the same longitudinal position in the flow path.

16. A method according to claim 13, wherein the flow path is provided with a narrow portion and the probe is extended into the narrow portion of the flow path.

17. A method according to claim 13, wherein the probe is made of one of stainless steel and aluminum.

18. A method for measuring mass flow comprising:

defining a flow path with a tubular side wall;

extending a probe through the side wall and into the flow path so that a first portion of the probe is located in the flow path and a second portion of the probe extends out of the side wall;

monitoring a temperature of the probe;

securing a heater element to the probe, wherein the heater element comprises a first and a second heater element secured to the second portion of the probe, and the second heater element is positioned further from the side wall than the first heater element;

providing energy to the heater element so that the probe remains at a constant temperature;

measuring the amount of energy provided to the heater element;

calculating the mass flow through the flow path based at least in part on the energy provided to the heater element; and providing a seal preventing fluid flowing through the flow path from contacting the heater element.

19. A method according to claim 18, wherein the seal is provided between the side wall and the probe.

20. A method for measuring mass flow comprising:

defining a flow path with a tubular side wall;

extending first and second probes through the side wall and into the flow path so that a first portion of the probes is located in the flow path and a second portion of the probes extends out of the side wall, wherein one of the first and the second probes extends further into the flow path than the other of the first and the second probes;

monitoring a temperature of the probe;

securing a heater element to each of the second portions of the probe;

providing energy to the heater elements so that the probes remains at a constant temperature;

measuring the amount of energy provided to the heater elements;

calculating the mass flow through the flow path based at least in part on the energy provided to the heater elements; and providing a seal preventing fluid flowing through the flow path from contacting the heater elements.

21. A method for measuring mass flow comprising:

defining a flow path with a tubular side wall;

extending a probe through the side wall and into the flow path so that a first portion of the probe is located in the flow path and a second portion of the probe extends out of the side wall;

monitoring a temperature of the probe;

securing a heater element to the probe;

providing energy to the heater element so that the probe remains at a constant temperature;

measuring the amount of energy provided to the heater element;

calculating the mass flow through the flow path based at least in part on the energy provided to the heater element; and providing a seal preventing fluid flowing through the flow path from contacting the heater element, wherein:

the flow path comprises first and second parallel flow paths sharing a single inlet and wherein the second flow path is closed by an end wall;

the probe comprises a first probe extending into the first flow path and a second probe extending into the second flow path;

the heater element comprises a first heater element positioned on the first probe and a second heater element positioned on the second probe; and the seal comprises a first seal preventing fluid flowing through the first flow path from contacting the first heater element and a second seal preventing fluid flowing through the second flow path from contacting the second heater element.

22. A method for measuring mass flow comprising;

defining a flow path with a tubular side wall;

extending a probe through the side wall and into the flow path so that a first portion of the probe is located in the flow path and a second portion of the probe extends out of the side wall, wherein a plug of material that is porous to the fluid being measured is positioned in the flow path and the probe is extended into the porous material;

monitoring a temperature of the probe;

securing a heater element to the probe;

providing energy to the heater element so that the probe remains at a constant temperature;

measuring the amount of energy provided to the heater element;

calculating the mass flow through the flow path based at least in part on the energy provided to the heater element; and providing a seal preventing fluid flowing through the flow path from contacting the heater element.

23. A method according to claim 22, wherein the plug is made of one of stainless steel and aluminum.

24. A mass flow measurement apparatus comprising:

a flow path defined by a tubular side wall;

a plug of material that is porous to the fluid being measured positioned in the flow path;

a probe extending through the side wall into the flow path so that a first portion of the probe is located in the flow path and a second portion of the probe extends out of the side wall, and wherein the probe extends into the porous material;

a heater element secured to the probe; and a seal preventing fluid flowing through the flow path from contacting the heater element.

25. A mass flow measurement apparatus according to claim 24, wherein the plug is made of one of stainless steel and aluminum.

* * * * *

UNITED STATES PATENT AND TRADEMARK OFFICE
CERTIFICATE OF CORRECTION

PATENT NO. : 6,868,723 B2
DATED : March 22, 2005
INVENTOR(S) : Shajii et al.

It is certified that error appears in the above-identified patent and that said Letters Patent is hereby corrected as shown below:

Column 8,
Line 19, after "flow", delete "oath", and insert thereof -- path --.

Signed and Sealed this

Twenty-eighth Day of June, 2005

JON W. DUDAS
*Director of the United States Patent and Trademark Office*